Dec. 6, 1966 E. SIRTL 3,290,181

METHOD OF PRODUCING PURE SEMICONDUCTOR MATERIAL BY CHEMICAL TRANSPORT REACTION USING $H_2S/H_2$ SYSTEM

Filed July 30, 1964

United States Patent Office 3,290,181

Patented Dec. 6, 1966

3,290,181

METHOD OF PRODUCING PURE SEMICONDUCTOR MATERIAL BY CHEMICAL TRANSPORT REACTION USING $H_2S/H_2$ SYSTEM

Erhard Sirtl, Munich, Germany, assignor to Siemens & Halske Aktiengesellschaft, Berlin, Germany, a corporation of Germany Filed July 30, 1964, Ser. No. 386,258
Claims priority, application Germany, Aug. 1, 1963, S 86,488
7 Claims. (Cl. 148—1.6)

Figure 1:
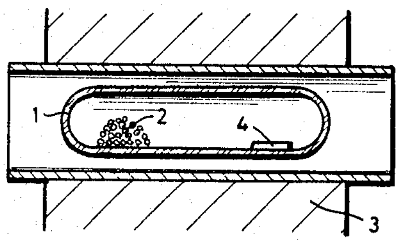

My invention relates to a method of producing pure, doped or undoped semiconductor material in crystalline, preferably monocrystalline form, by a chemical transport reaction in which solid semiconductor material is converted at high temperature to a gaseous compound and is dissociated and precipitated from the compound at a different locality, at a different temperature.

Such chemical transport reaction methods for precipitating highly pure semiconductor materials are disclosed using a transport media of halogens or halogen compounds in Sirtl et al. application Serial No. 323,307. These substances, however, are extremely aggressive and, at the high operating temperatures involved, require exacting quality and handling of the necessary equipment.

I propose to avoid this disadvantage by using the system $H_2S/H_2$ as the transporting medium and overcome the very high reaction temperatures involved, because of the high heat of formation of the oxides.

It is an object of my invention to provide a chemical transport reaction method for the production of highly pure, doped or non-doped semiconductor materials, which avoids highly aggressive transport media and also affords reducing the occurring reaction temperature, thus minimizing or avoiding the difficulties heretofore encountered.

According to the invention, a chemical transport reaction is performed by using the system $H_2S/H_2$ as the transport medium and adjusting the reaction conditions so that the transport takes place via a volatile sulfide, preferably a sub-sulfide of the semiconductor material.

According to one way of carrying out my method, the semiconductor material is precipitated and caused to grow as a layer upon a crystalline, preferably monocrystalline, substrate of semiconductor material. The starting material may consist of a shaped body which consists at least partially of the semiconductor material and which is heated to such a temperature that the semiconductor material is converted to its sub-sulfide and thereby removed from the shaped body The starting material may analogously be used in pulverulent form and be heated up to the formation of the semiconductor sub-sulfide.

According to a particularly favorable embodiment of the invention, a substrate of semiconductor material is placed into heat conducting contact with a surface of a heated carrier body which, at least at the contacted surfaces, consists of the semiconductor material to be precipitated upon the substrate. This is preferably done by placing the substrate on top of the carrier body so that the transported semiconductor material is precipitated upon the bottom surface of the subtrate to grow a crystalline or mono-crystalline layer thereupon.

This embodiment of the method is particularly suitable in cases where the evolving sub-sulfide at temperatures, which secure a sufficiently high lattice mobility, is available in such a concentration that the sulfide can be utilized for the transport via the gaseous phase. That is, the time required for transporting a given quantity of the semiconductor material must be of the same order of magnitude as the time required in conventional epitaxial methods for precipitating the layer of the same material and in the same thickness.

With this manner of performing the method according to the invention, the reaction space in which the transport reaction takes place is constituted by the interspace between the carrier and the semiconductor substrate. As a result, disturbances, such as the ingress of impurities into the grown layer of foreign materials contained in the surrounding space of the reaction vessel is virtually avoided, because with this method the vessel walls can be kept at a lower temperature. This also applies, if the carrier consists only partially of the semiconductor material to be transported.

The hydrogen content of the reaction gas prevents the semiconductor surface from being coated with a less volatile sulfide, whereas the hydrogen sulfide simultaneously secures the formation of the sulfide of the semiconductor material to be transported.

The adjustment of the transport rate and quantity of the precipitated semiconductor material is effected by adjusting the temperature of the carrier and the composition and concentration of the hydrogen sulfide and hydrogen transport gas. These parameters determine the concentration of the subsulfide in the interspace between the carrier and the substrate and consequently the rate of transportation and the quantity of the transported material.

The transport of semiconductor material from the top of the carrier to the bottom side of the substrate, requires maintaining a temperature gradient so directed that the lower side of the substrate has a lower temperature than the upper side oft he carrier. It is particularly favorable to utilize for the transport reaction, the temperatures differential resulting from the impeded heat transfer between the heated carrier and the adjacent semiconductor (substrate) body.

According to another mode of the method, a carrier or supply of polycrystalline semiconductor material and a substrate of monocrystalline semiconductor material are used.

According to another feature of the invention, the carrier employed may consist of a heater coated with semiconductor material. For example, a heater carrier consisting of graphite or silicon carbide coated with semiconductor material is suitable. However, also suitable as carriers are one or more circular discs whose size corresponds to the substrates of semiconductor material to be placed upon the discs; and the carrier disc can then be placed upon a heater consisting for example of graphite or silicon carbide.

To produce thin wafers of films of monocrystalline material, my invention may also be performed by first growing an epitaxial layer in the above-described manner and thereafter severing the layer from the substrate.

The invention is also applicable for producing doped semiconductor material. For this purpose, a heating carrier may be used which contains doped semiconductor material, for example a carrier with semiconductor material which contains dopant for the conductance type opposed to that of the substrate upon which an epitaxial layer is to be precipitated. Dopant substances can also be added to the reaction gas.

The carrier may differ in semiconductor material from the substrate. For example, the carrier may consist of gallium arsenide at least on the side facing the substrate to be heated, while the substrate consists of germanium.

A mixture of $H_2S$ and $H_2$ is preferably employed as the reaction gas. However $CS_2$ may also be used in lieu of $H_2S$. In the latter case the hydrogen proportion must be doubled in order to approximately establish the equilibrium conditions of the system $H_2S/H_2$.

Figure 2:
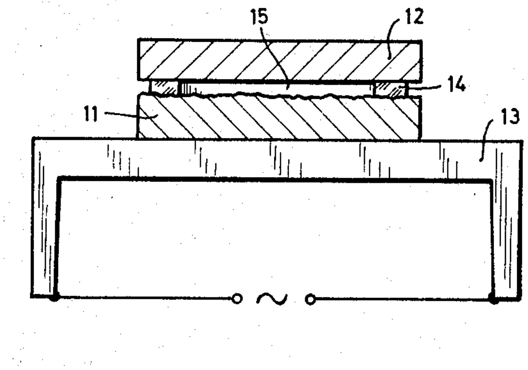

The invention will be further described with reference to the accompanying drawing in which:

FIG. 1 shows schematically, and in section, a device for performing the method according to the invention, and FIG. 2 shows partly in section a portion of a different device for performing the method.

According to FIG. 1, the reaction vessel 1 consists of quartz ampule. The semiconductor material 2 is placed into the reaction vessel near one end thereof and consists for example of polycrystalline gallium arsenide. The reaction vessel is filled with a mixture of $H_2S/H_2$ in the ratio 1:200, the partial pressure of $H_2S$ being approximately 5 to 20 Torr. After filling the reaction gas into the ampule, it is fused off and placed into a tubular furnace 3. The temperature profile of the furnace is so adjusted that a temperature of about 950° C. obtains at the location of the polycrystalline starting material 2, and a temperature of about 850° C. near the other end. The semiconductor material is transported via the sub-sulfide and is precipitated at the coldest parts of the reaction vessel and thus upon a substrate 4.

When using SiC, conventional vessel materials such as quartz can no longer be used. It is then advisable to employ the method of Lely heretofore used for the resublimtion of SiC in gas.

The system according to the invention affords obtaining an increased yield per unit time at relatively low temperatures, for example 1800° C. For this purpose the tubular furnace, such as a carbon tube surrounding the reaction vessel, is preferably heated by high-frequency induction.

FIG. 2 shows a portion of equipment for performing the method under reaction conditions, which causes material to be transported from the top side of a carrier 11, consisting at least partially of semiconductor material, to the bottom side of a monocrystalline substrate disc 12 of semiconductor material. Carrier 11 is heated by a heater 13 to the required reaction temperature. Spacers 14, in form of rings or rods, are placed between the carrier 11 and the substrate 12 to provide securing the interspace needed for the diffusion of the reaction gases. The assembly is then placed into a reaction vessel of quartz, not shown in FIG. 2, which has valves for respectively supplying and withdrawing the reaction gas mixture. The temperature difference required for the transport reaction is determined by the distance between the carrier 11 and the substrate 12 as well as by the impeded heat transfer between carrier and substrate, the resulting temperature differential being dependent upon the particular materials.

It is an advantage of this method that the transport reaction occurs only in the narrow reaction zone 15 between the carrier 11 and the substrate 12 so that the convection phenomena occurring in this zone prevent ingress of impurities from the surrounding reaction space of the processing vessel.

The assembly according to FIG. 2 is particularly well suitable for the production of so-called hetero junctions.

For this purpose a preferably polished substrate disc, for example, monocrystalline germanium, is placed upon a carrier of polycrystalline gallium arsenide. Spacers of inert material are placed between carrier and substrate in order to provide the spacing required for the diffusion of the reaction gases. The carrier is then indirectly heated to about 950° C. The reaction gas mixture is passed at constant speed through the reaction vessel and a reaction equilibrium in accordance with the equation occurs $$2GaAs + H_2S \underset{\text{lower temp.}}{\overset{\text{higher temp.}}{\rightleftharpoons}} Ga_2S(g) + As_2(g) + H_2$$

To remove any impurities as may be contained on the surface of the substrate discs, the discs are annealed for about 10 minutes at the reaction temperature of 950° C. in a flow of hydrogen prior to commencing the epitaxial precipitation.

The composition of the reaction gas is adjusted in accordance with the reaction temperature and is preferably chosen so that during precipitation, formation of a sulfide coating on the semiconductor surface is prevented, and the gallium transported by the temperature gradient is in the form of $Ga_2S$. The arsenic is transported in form of arsenic vapor.

The following reaction conditions have been found particularly favorable for the epitaxial precipitation of gallium arsenide upon germanium.

The composition of the reaction gas is preferably given the ratio $H_2S:H_2=1:200$. The partial pressure of $H_2S$ in the mixture is about 5 Torr. The flow speed of the reaction gas is approximately 1 liter per minute per cm.$^2$. The carrier is kept at 950° C. The temperature difference between the top of the carrier and the bottom of the substrate is between 15 to 50° C.

When a germanium monocrystal substrate is used and its bottom side corresponds to the (111)-face of the crystal, then the gallium side of the gallium arsenide carrier which corresponds to the (111)-face is located adjacent to the germanium in the epitaxial layer.

The method of the invention is analogously applicable to the epitaxial precipitation of germanium upon gallium arsenide. In this case the reaction temperature, i.e. the temperature at the top side of the heated carrier, is about 850° C. and the composition of the reaction gas has the ratio $H_2S:H_2=1:100$. The transport of germanium takes place according to the equation:

$$Ge + H_2S \underset{\text{lower temp.}}{\overset{\text{higher temp.}}{\rightleftharpoons}} GeS(g) + H_2$$

The method of the invention, of course, is not limited to the production of hetero junctions. My method can also be used, to the same advantage, for the precipitation of gallium arsenide upon gallium arsenide or the precipitation of germanium upon germanium or silicon upon silicon.

The method is also applicable for producing carbides and nitrides, for example SiC in coarse crystalline or monocrystalline form. The Sic transport occurs in accordance with the equation:

$$SiC + 2H_2S \underset{\text{lower temp.}}{\overset{\text{higher temp.}}{\rightleftharpoons}} SiS(g) + CS(g) + 2H_2$$

The reaction temperature in this transport reaction is approximately 1500° C. The composition of the reaction gas may have the ratio $H_2S:H_2=1:500$. SiC is used as the substrate for the epitaxial layer.

The method of the invention also permits transferring desired doping substances and simultaneously obtaining a depletion of undesired impurities. For example, germanium contained in gallium arsenide can be built quantitatively into the grown layer, whereas most of the impurities become enriched in the residue on account of the low volatility of their sulphides or subsulphides. The grown epitaxial layer can also be doped by adding doping substances to the reaction gas mixture.

I claim:

1. In the method for producing pure semiconductor material in crystalline form by means of chemical transport reactions in which solid semiconductor material is converted by heating into a gaseous compound thereof and by utilization of a temperature gradient is dissociated to precipitate semiconductor material at a different location, the improvement which comprises using the system $H_2S/H_2$ as the transporting medium and adjusting the reaction conditions so that the transport takes place via a volatile sulfide, of the semiconductor material.

2. In the method for producing pure semiconductor material in crystalline form by means of chemical transport reactions in which solid semiconductor material is converted by heating into a gaseous compound thereof and by utilization of a temperature gradient is dissociated to precipitate semiconductor material at a different location, the improvement which comprises using the system $H_2S/H_2$ as the transporting medium and adjusting the reaction conditions so that the transport takes place via a volatile sulfide of the semiconductor material onto a monocrystalline substrate of semiconductor material.

3. In the method for producing pure semiconductor material in crystalline form by means of chemical transport reactions in which solid semiconductor material is converted by heating into a gaseous compound thereof and by utilization of a temperature gradient is dissociated to precipitate semiconductor material at a different location, the improvement which comprises using the system $H_2S/H_2$ as the transporting medium and a shaped body consisting at least partially of a semiconductor material is the starting material, heating said body to a temperature at which the semiconductor material of said body is converted to its sub-sulfide and eliminated from the body.

4. In the method for producing pure semiconductor material in crystalline form by means of chemical transport reactions in which solid semiconductor material is converted by heating into a gaseous compound thereof and by utilization of a temperature gradient is dissociated to precipitate semiconductor material at a different location, the improvement which comprises using the system $H_2S/H_2$ as the transporting medium and a pulverulent semiconductor source material, heating said source material to a temperature whereby it converts to its sub-sulfide.

5. In the method for producing pure semiconductor material in crystalline form by means of chemical transport reactions in which solid semiconductor material is converted by heating into a gaseous compound thereof and by utilization of a temperature gradient is dissociated to precipitate semiconductor material at a different location, the improvement which comprises using the system $H_2S/H_2$ as the transporting medium and adjusting the reaction conditions so that the transport takes place via a volatile sulfide of the semiconductor material from a heated carrier body in heat conducting contact with a substrate so that monocrystalline material is grown on the side of the substrate facing the carrier.

6. In the method for producing pure semiconductor material in crystalline form by means of chemical transport reactions in which solid semiconductor material is converted by heating into a gaseous compound thereof and by utilization of a temperature gradient is dissociated to precipitate semiconductor material at a different location, the improvement which comprises using the system $H_2S/H_2$ as the transporting medium and adjusting the reaction conditions so that the transport takes place via a volatile sulfide of the semiconductor material from the top of a heated gallium arsenide carrier onto the bottom of a germanium substrate spaced from said carrier to produce a temperature gradient.

7. The process of claim 1 wherein the reaction mixture of $CS_2$ and $H_2$ is used to produce the transport medium.

No references cited.

DAVID L. RECK, *Primary Examiner.*

N. F. MARKVA, *Assistant Examiner.*